Jan. 3, 1928.
H. DE B. KNIGHT
1,654,979
REGULATION OF ELECTRIC DISTRIBUTION SYSTEMS
Filed Oct. 4, 1926
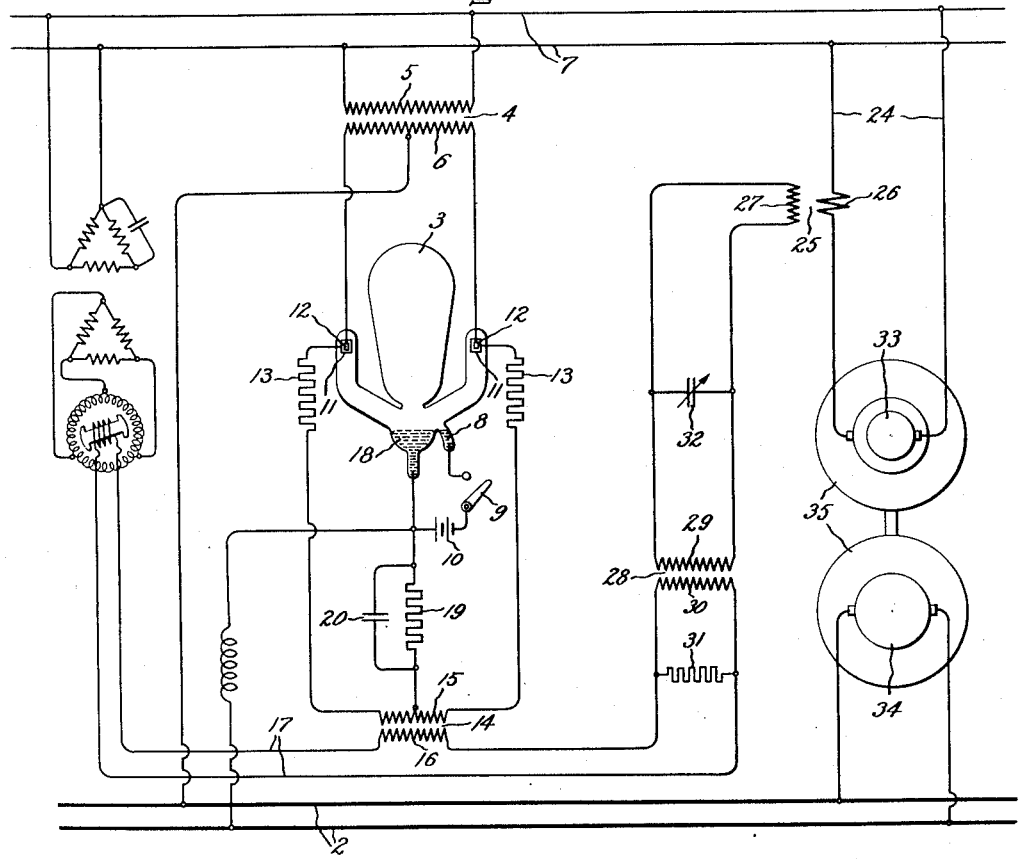
Fig.1.
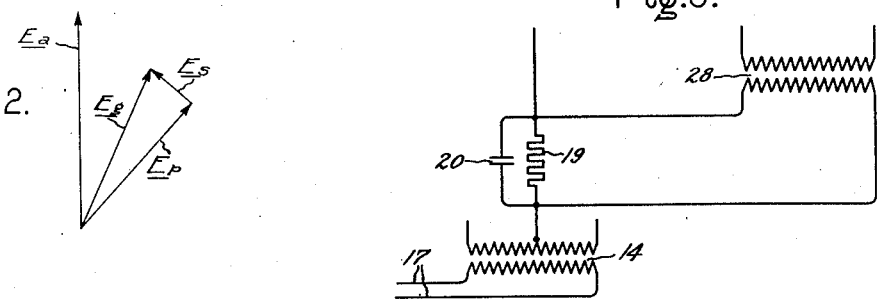
Fig.2.
Fig.3.
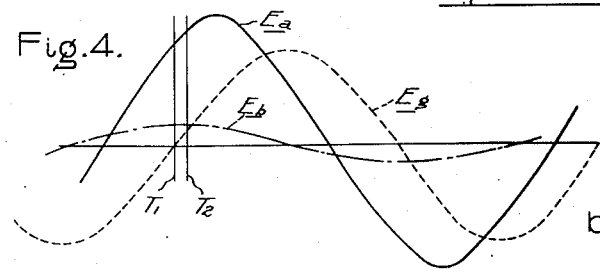
Fig.4.
Inventor:
Henry de B. Knight,
by
His Attorney.

Patented Jan. 3, 1928.

1,654,979

UNITED STATES PATENT OFFICE.

HENRY DE B. KNIGHT, OF RUGBY, ENGLAND, ASSIGNOR TO GENERAL ELECTRIC COMPANY, A CORPORATION OF NEW YORK.

REGULATION OF ELECTRIC DISTRIBUTION SYSTEMS.

Application filed October 4, 1926, Serial No. 139,297, and in Great Britain July 23, 1926.

This invention relates to the regulation of the supply of electric current from a source of direct current operating in parallel with vapor electric discharge devices in which the voltage of the direct current output can be controlled by control electrodes. It is sometimes desirable to operate the direct current sources substantially at one particular load, arranging for the vapor electric discharge device to take up the remaining load of the system. In a copending application for Letters Patent, Serial No. 125,309, filed July 27, 1926, and assigned to the same assignee as the present application, I have described a system which operates to increase the voltage of the direct current output of the vapor electric discharge device, thus causing it to take more of the load, at any change in total load under which the direct current source would tend to increase its output, or to cause the vapor electric discharge device to take up the greater part of the increase of the load while the direct current source takes up only a predetermined smaller increase in load, keeping within required limits; the reverse operation taking place when the load decreases. In the particular arrangement described by the aforesaid copending application, the control electrode potential of the vapor electric discharge device, and in consequence the proportion of the total load which it takes, is adapted to vary in response to variations in the current in the output lines of the direct current source.

The object of the present invention is to provide an arrangement which may be used when the source of direct current is a motor generator set or other apparatus having alternating current supply mains, and to that end it consists in arranging the control electrode potential to be controlled by an electrical condition such as the current in the alternating current supply mains through which the source of direct current is energized.

My invention is illustrated in the accompanying drawings, in which Fig. 1 shows diagrammatically an arrangement in which a vapor electric discharge device shown as a mercury arc rectifier operates in parallel with a direct current source shown as a motor-generator set; Fig. 2 is a vector diagram showing the variation that takes place in the potential of the control electrodes of the mercury arc rectifier shown in Fig. 1; Fig. 3 shows a modified arrangement of connections; and Fig. 4 shows curves of the rectifier voltages with a modified arrangement of connections.

Referring to Fig. 1 of the drawings, the direct current source is shown as a motor generator set 35, the direct current end 34 supplying current to direct current mains 2 and the alternating current end 33 being supplied through mains 24 from an alternating current source which may or may not be the same as the source 7 which supplies a mercury arc rectifier 3 through a transformer 4. The rectifier 3 is arranged to operate in parallel on its output side with the motor generator set 35. The transformer 4 comprises a primary winding 5 and a secondary winding 6, the neutral of the secondary winding 6 and the cathode 18 of the rectifier 3 being connected through the usual choke coils and other auxiliaries as required to the negative and positive lines respectively of the mains 2.

The rectifier 3 comprises the cathode 18, an ignition device shown as an ignition electrode 8, switch 9 and battery 10; anodes 12 connected to the secondary winding 6 of the transformer 4, and a control electrode 11 associated with each anode. Each control electrode 11 is connected to the cathode 18 through its own resistor 13, a section of the secondary 15 of a transformer 14, and a common resistor 19 which connects the neutral point of the secondary winding 15 to the cathode 18 and which may if desired be shunted by a smoothing condenser 20. The primary winding 16 of the transformer 14 is connected through leads 17 and a resistor 31 to the alternating current mains 7 through a phase shifting device, such as a phase shifting transformer or induction regulator.

A current transformer is indicated at 25 and comprises a primary winding 26 and a secondary winding 27. The primary winding 26 is connected in one of the supply mains 24 to the motor generator set 35, but where the mains 7 supply both the rectifier 3 and the motor-generator set 35, the winding 26 may, if desired, be connected in one of the supply mains 7. The secondary winding 27 of the transformer 25 supplies the primary winding 29 of a transformer 28, the secondary winding 30 of which is connected across the resistor 31 which is in series with the supply from the phase shifter to the primary 16 of the transformer 14. A condenser 32 shunted across the primary winding 29 serves to set the phase of the secondary voltage of the current transformer 25 with respect to the voltage of the phase shifter.

The mode in which the parallel operation of the motor generator set 35 and the rectifier 3 is regulated will be clear from Fig. 2, in which $E^a$ represents the anode voltage of supply to the rectifier 3, $E^p$ represents the voltage of the supply from the phase shifter, the phase of which with respect to $E^a$ may be set as required, and $E^s$ represents the voltage drop across resistor 31 due to the current transformer 25. $E^g$ represents the resultant voltage impressed on the control electrode 11. From Fig. 2 it is clear that an increase of current in the mains 24 will lengthen the vector $E^s$ and thus alter the phase of $E^g$ with respect to $E^a$. This will alter the moment at which the valve opens and accordingly alter the output voltage of the rectifier. For the correct operation according to the present invention, an increase of current in mains 24 would cause $E^g$ to lead its original position, thus opening the rectifier valve earlier and increasing the rectifier output voltage.

Instead of connecting the secondary winding 30 of the transformer 28 across the resistor 31, it may, alternatively, be connected across the resistor 19, as shown in Fig. 3. In this way an alternating biasing potential is applied to the grids, varying in magnitude with the current in the mains 24. Curves of the rectifier voltages with this arrangement of connections are shown in Fig. 4, in which $E^a$ represents the voltage impressed on an anode of the rectifier, and $E^g$ represents the voltage on the corresponding control electrode, as supplied from the transformer 14. The alternating biasing voltage $E^b$ will cause $E^g$ to pass through zero or through that value, approximately zero, at which the valve opens at a time $T_2$ instead of $T_1$, thus causing the valve to open at a different time and alternating the output voltage of the rectifier. The time $T_2$ will clearly depend on the magnitude of $E^b$ and hence on the current in the mains 24. For the correct operation according to the present invention, time $T_2$ would occur earlier, thus increasing the rectifier output voltage, when the current in the mains 24 increased.

The invention has been described with reference to single phase apparatus only. It is evident, however, that the invention is not limited thereto but is applicable to apparatus and supply at any number of phases.

What I claim as new and desire to secure by Letters Patent of the United States is:—

1. The combination of direct and alternating current circuits, a motor generator set connected between said circuits, a vapor electric device provided with a cathode and an anode connected between said circuits and with an electrode arranged to control the current transmitted between said cathode and anode, and means arranged to apply to said electrode a potential which varies in accordance with the current supplied to said motor generator set.

2. The combination of a pair of terminals, a vapor electric device provided with a cathode and an anode connected between said terminals and with an electrode arranged to control the current transmitted between said cathode and anode, a device connected to said terminals for converting alternating current to direct current, and means arranged to apply to said electrode a potential which is varied in accordance with the alternating current of said device.

3. The combination of alternating and direct current circuits, a mercury rectifier provided with a cathode and an anode connected between said circuits and with an electrode arranged to control the current transmitted between said cathode and anode, a device connected to said direct current circuit for converting alternating current to direct current, and means arranged to apply to said electrode a potential which varies in accordance with the alternating current of said device.

4. The combination of a pair of terminals a mercury rectifier provided with a cathode and an anode connected between said terminals and with an electrode arranged to control the current transmitted between said cathode and anode, a device connected to said terminals for converting alternating current to direct current, means arranged to apply to said electrode a potential which is varied in accordance with the alternating current of said device, and means arranged to control the phase of said potential.

5. The combination of a pair of terminals, a vapor electric device provided with a cathode and an anode connected between said terminals and with an electrode arranged to control the current transmitted between said cathode and anode, a motor generator set connected to said terminals for converting alternating current to direct current, means arranged to apply to said electrode a potential which is varied in accordance with the alternating current of said motor generator set, and a condenser connected between said device and said electrode for controlling the phase of said potential.

In witness whereof, I have hereunto set my hand this fourteenth day of September, 1926.

HENRY DE B. KNIGHT.